Aug. 8, 1967  R. H. ALEXANDER  3,334,448
SPINDLE LOCK FOR A POWER TOOL
Filed March 20, 1964
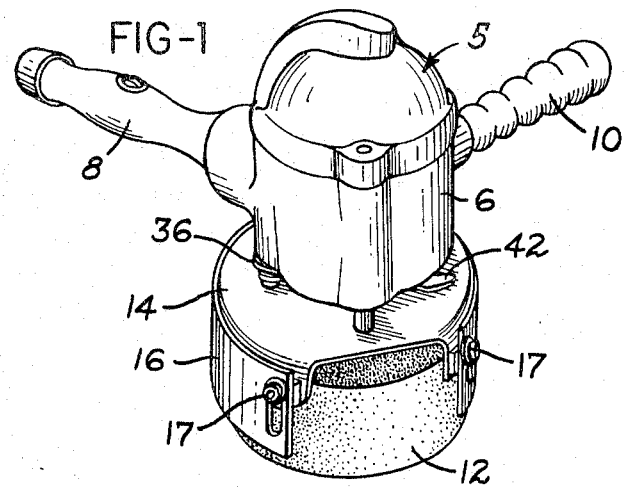
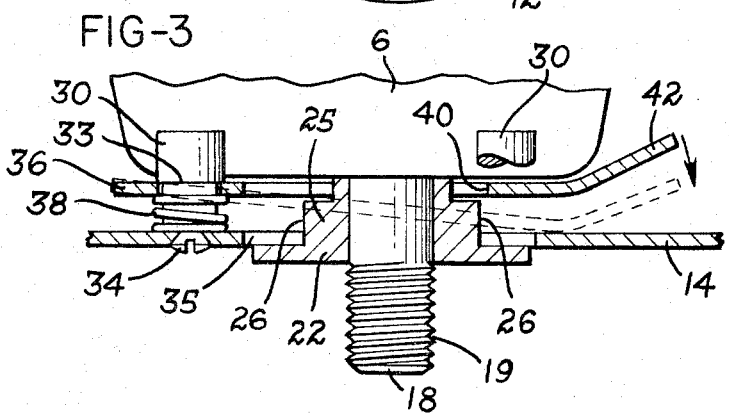
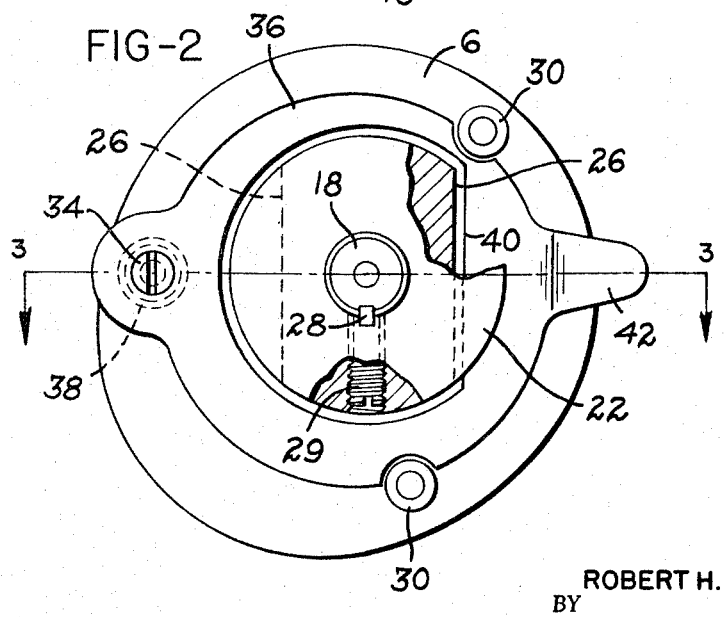
INVENTOR.
ROBERT H. ALEXANDER
BY
Marechal, Biebel, French & Bugg
ATTORNEYS 3,334,448
SPINDLE LOCK FOR A POWER TOOL
Robert H. Alexander, Dayton, Ohio, assignor to Rockwell Manufacturing Company, Pittsburgh, Pa., a corporation of Pennsylvania
Filed Mar. 20, 1964, Ser. No. 353,438
6 Claims. (Cl. 51—170)

This invention relates to a spindle lock and more particularly to a lock which will prevent the spindle of a power-driven tool from rotating while the operator is removing, replacing or tightening the tool element.

In pneumatic and electrically motor-driven tools there exists a common nuisance and inconvenience in operating of these tools, especially tools of this type such as portable rotary-power sanders, drills, grinders, saws, polishers and the like. These power tools often require the frequent removal and replacing of the tool element, for example, when the operator of a power grinder must replace the abrasive wheel for another job which requires a different wheel configuration or when the wheel has become excessively worn. Commonly, the tool element is held to the spindle by a threaded fastening means, either by a separate nut or by a threaded hub which is an integral part of the tool element. In either case, the operator must prevent the spindle from rotating so that he can unthread the nut or hub and thereby remove the tool element. Of course, the operator must similarly hold the spindle when he desires to tighten the tool element to the threaded spindle.

When the nut is separate from the tool element and is threaded on the spindle after the tool element is placed on the spindle, it is common for the operator to grip the tool element in one hand while the nut is removed with a wrench in the other hand. Not only can this be a dangerous procedure, as for example, when the tool element is a circular saw blade but it is inconvenient and awkward, especially when a safety guard is provided around a portion of a tool element.

On those power tools where the tool element has an integral threaded hub or the nut is recessed within the tool element where the nut is inaccessible, it is mandatory that some means be provided to prevent the spindle from rotating while the tool element is threaded either on or off the spindle. One method which has been used is to provide the spindle with a pair of diametrically opposed flats for gripping with an open end wrench or spanner. Another method which has been used is to slot the end of the spindle so that a screwdriver or a key may be inserted in order to prevent the spindle from rotating. Still other types of spindle locks have been devised which involve the insertion of a key or pointed object into a transverse hole in the spindle between the tool element and the head of the power tool. The problem with all of these devices is that not only is it awkward and inconvenient for the operator to grip the tool element and at the same time insert the wrench or screwdriver or key while also supporting the power tool, it is difficult to obtain substantial torque resistance with these devices. Furthermore, the keys, wrenches, or the like are easily misplaced or lost.

It is therefore an object of the present invention to provide a spindle lock adapted for temporarily preventing the rotation of the spindle of a power tool during removal or replacing of the tool element and which can be mounted directly on the head of a power tool.

Another object of the present invention is to provide a spindle lock for a power tool which provides a substantially high torque resistance and further is simple in construction, operation and economical to manufacture.

As another object, the present invention provides an easily accessible spindle lock which is adaptable for use with a close-coupled safety guard and which further can be easily operated by the same hand which is supporting the power tool.

Another important object of the present invention is to provide a spindle lock, adapted for mounting on the head of a power tool, which remains ineffective and which cannot be engaged until the spindle has essentially stopped rotating.

An additional object of the present invention is to provide a spindle lock, which is adaptable for mounting on the head of a power tool, where the spindle lock is rugged in construction to withstand the rough treatment that the power tool and spindle lock may receive, as for example, when the tool is a power grinder which is used in a foundry amidst sand and grit.

Other objects and advantages of the present invention are apparent from the following description, the accompanying drawings and the appended claims.

In the drawings—

FIG. 1 is a perspective view of a portable power grinder with the spindle lock mounted on the head, this being one type of power tool with which the spindle lock according to the present invention may be used;

FIG. 2 is a view looking axially at the end of the spindle head of the power tool showing the arrangement of the elements of the spindle lock according to the present invention; and FIG. 3 is a partial sectional view, as viewed along the line 3—3 of FIG. 2, showing the spindle both in its normally unlocked position and by dotted lines in the locked position.

Referring to the drawings, the portable power grinder generally referred to as 5 in FIG. 1 comprises a motor housing 6 which is commonly constructed of a light metal casting. While the power grinder is being used, it is in part supported by the operator gripping the main control handle 8 in one hand and the auxiliary handle 10 in the other hand, both of which project from the motor housing 6. Also projecting from the motor housing 6 and rotatably mounted therein is a spindle 18. Attached to the spindle which on this tool is an extension of the shaft of the motor (not shown), is shown an abrasive wheel 12 having a flat annular radial working face. Positioned between the abrasive wheel 12 and the motor housing 6 is a radially extending face guard 14 which is mounted on the motor housing and further supports a peripheral guard 16 which is adjustably mounted by means of the screws 17.

As shown in FIG. 3, the spindle 18 which extends from the motor housing is provided with conventional threads 19. Mounted on this spindle is a member referred to as an inner wheel washer 22 including a shank or collar 25 having two diametrically opposed flats 26, which provides a surface eccentric to the axis of rotation of the spindle. The key 28 and set screw 29 serve to lock the inner wheel washer 22 to this spindle for rotation therewith. As the abrasive wheel is threaded on the spindle the inner wheel washer serves as a back-up plate for the threaded hub (not shown) recessed within the abrasive wheel.

Threaded into the spindle head of the motor housing 6 are three studs 30 and on one of the studs is provided a shoulder 33. The screws 34 are threaded into tapped holes in the studs to secure the radial face guard 14

(partially shown in FIG. 3). The radial face guard as shown in FIG. 3 contains a circular opening 35 concentric with the spindle 18. This opening permits the radial face guard 14 to be removed and reassembled without disturbing the inner wheel washer 22 which is keyed to the spindle.

Disposed between the spindle head of the motor housing 6 and the radial face guard 14 is a generally annular shaped stop lever 36 which is held in alignment with the inner wheel washer 22 by the three studs 30. The stop lever 36 is held normally tight against the shoulder 33 on the stud 30 by the pressure of a compression spring 38 which is spaced between the radial face guard 14 and the stop lever 36. On those power tools not requiring a face guard, the head of the screw 34 may serve to retain the compression spring 38.

The center opening of the stop lever 36, shown in FIG. 2, includes a flat surface 40 which is adapted to engage one of the flats 26 on the inner wheel washer 22, provided of course that the flat 26 is first aligned with the flat surface 40 of the stop lever. Included as part of the stop lever and extending from its outer periphery is a finger tab 42. After one of the flats 26 of the inner wheel washer is aligned with the flat surface 40 of the stop lever by slowly hand turning the tool element, the finger tab 42 may be depressed toward the radial face guard 14, against the pressure of the compression spring 38, thereby causing the stop lever 36 to tilt about the shoulder 33 of the stud 30 so that the flat surface 40 will engage one of the flats 26 on the inner wheel washer 22 as shown by the dotted lines in FIG. 3. While the stop lever is engaged, the rotation of the spindle is prevented and the tool element may readily be removed or replaced from the threaded spindle. It is apparent that when the finger pressure is relieved from the finger tab, the stop lever will spring back and return to its normal position as shown in FIG. 3 and thereby release the spindle 18 so it may rotate freely when the motor is energized.

It is clear from the above description that the present invention provides an effective, simple and economical spindle lock which is adaptable for mounting on many different types of power tools where it is necessary to hold the spindle from rotating while the tool element is removed, replaced or tightened. The device provided by this invention is especially convenient to use in that the spindle lock can be easily operated by the hand which is simultaneously supporting the power tool. It is convenient from a constructional standpoint in that it fits in the small space provided between the head of the power tool and a close-coupled safety guard around the tool element.

One important feature provided by the spindle lock of the present invention is the fact that the stop lever may not be engaged to lock the spindle while the spindle and tool element are running. This feature is accomplished inherently by having the engaging surfaces on a diameter substantially larger than the spindle diameter so that when the spindle is rotated by the motor the peripheral speed of the flats on the inner wheel washer does not allow sufficient time to provide the necessary alignment with the flat surface on the stop lever.

As mentioned above, another inherent feature of the spindle lock of the present invention is that as soon as the finger pressure is removed from the tab 42 of the stop lever 36, the stop lever will return to its normally disengaged position due to the pressure provided by the compression spring 38. This self-releasing feature will thereby prevent the operator from accidently turning on the motor while the lock is engaged which is especially important when an electric motor is used in the power tool so as to prevent overheating of the motor.

When the spindle lock is engaged in the manner described above, it will be seen that due to both the lengths of the engaging surfaces and the appreciable eccentric distances of the surfaces to the center of the spindle, a moment arm producing substantially high torque resistance is provided by the spindle lock herein disclosed. In some cases, this high torque resistance is necessary in order to break loose the nut or threaded hub of the tool element which has been constantly urged into a tighter position on the threaded spindle during the use of the power tool. This results from the common practice and necessity of threading the tool element onto the spindle in a direction opposite to the direction of rotation of the spindle.

While the form of apparatus herein described constitutes a preferred embodiment of the invention, it is to be understood that this invention is not limited to this precise form of apparatus and that changes may be made therein without departing from the scope of the invention which is defined in the appended claims.

What is claimed is:

1. A spindle lock for a power tool wherein said tool includes a spindle rotatably mounted in a housing, said lock comprising: washer means mounted in a fixed position on the spindle including a flat surface rotatable with the spindle, a generally flat stop lever positioned substantially transverse to said spindle and adjacent said washer means, said stop lever including a flat surface engageable with said flat on said washer means to prevent rotation of said spindle, a pivotable mounting for said lever for movement of said lever generally axially along said spindle, means holding said lever normally in spaced relation to said washer means, and said holding means including a yieldable part operative under manual pressure to permit said flat surface on said lever to engage said flat section on said washer means.

2. A spindle lock for a power tool wherein said tool includes a spindle rotatably mounted in a housing, said lock comprising: a member fixed to the spindle and providing an eccentric surface rotatable with the spindle, a generally annular shaped stop lever adjacent said member, said stop lever including an aperture having a stop surface engageable with said eccentric surface on said member, and means for yieldably mounting said stop lever substantially transverse to the spindle to permit said stop surface to engage said eccentric surface under manual pressure.

3. A power tool comprising a housing having a motor contained therein, a spindle rotatably mounted within said housing and projecting therefrom, a washer member mounted on said spindle for rotation therewith and providing a surface eccentric to the axis of rotation of the spindle, a generally flat stop lever positioned substantially transverse to said spindle and adjacent said washer member, said stop lever having a surface engageable with said washer member, and means for pivotally mounting said stop lever for movement generally axially along said spindle for engagement with said washer member to prevent rotation of said spindle.

4. A portable power tool adapted to be supported by the hands, said tool comprising a housing having a motor contained therein, a spindle rotatably mounted within said housing and projecting therefrom, washer means mounted in fixed position on said spindle for defining a flat surface rotatable with said spindle, a generally annular shaped stop lever pivotally mounted on said housing and positioned substantially transverse to said spindle and adjacent said washer means, said stop lever including a flat surface engageable with said flat surface on said washer means when said stop lever is pivoted, spring means normally urging said stop lever out of engagement with said washer means, and a tab extending outwardly from said stop lever for pivoting said stop lever into engagement with said washer means by one of the hands supporting the power tool.

5. A power tool comprising a housing having a motor contained therein, a spindle rotatably mounted within said housing and projecting therefrom, washer means mounted in fixed position on said spindle for defining a flat surface rotatable with said spindle, a generally annular shaped stop lever pivotally mounted on said housing, at least one spacer projecting from said housing for mounting said stop lever in a position substantially transverse to said spindle, and said stop lever further having a flat surface engageable with said flat surface on said washer means when said stop lever is pivoted so that said spindle is prevented from rotating.

6. A spindle lock as defined in claim 2 wherein said stop lever surrounds said spindle and is movable into generally surround relationship with said member causing said stop surface on said lever to engage said eccentric surface on said member.

References Cited

UNITED STATES PATENTS

| | | | |
|---|---|---|---|
| 2,702,098 | 2/1955 | Staak | 188—69 |
| 2,872,197 | 2/1959 | Happe | 279—1 |
| 2,993,518 | 7/1961 | Bork | 143—132.8 X |

ROBERT C. RIORDON, *Primary Examiner.*

D. G. KELLY, L. S. SELMAN, *Assistant Examiners.*